United States Patent
Rigby et al.

(10) Patent No.: US 7,820,726 B2
(45) Date of Patent: Oct. 26, 2010

(54) REMOVAL OF CARBON DIOXIDE FROM A GAS STREAM

(75) Inventors: Anthony Malcolm Rigby, Ince (GB); Jill Hui Chiun Chieng, Amsterdam (NL); Gijsbert Jan Van Heeringen, Amsterdam (NL); Hans Michiel Huisman, Rotterdam (NL)

(73) Assignee: Shell Oil Company, Houston, TX (US)

( * ) Notice: Subject to any disclaimer, the term of this patent is extended or adjusted under 35 U.S.C. 154(b) by 417 days.

(21) Appl. No.: 11/920,207

(22) PCT Filed: May 11, 2006

(86) PCT No.: PCT/EP2006/062226

§ 371 (c)(1),
(2), (4) Date: Nov. 9, 2007

(87) PCT Pub. No.: WO2006/120223

PCT Pub. Date: Nov. 16, 2006

(65) Prior Publication Data

US 2009/0099269 A1     Apr. 16, 2009

(30) Foreign Application Priority Data

May 13, 2005 (EP) .................................. 05252967

(51) Int. Cl.
*C07C 27/00* (2006.01)

(52) U.S. Cl. ........................................ 518/700; 518/703

(58) Field of Classification Search .................. 518/700, 518/703
See application file for complete search history.

(56) References Cited

U.S. PATENT DOCUMENTS 4,749,555 A   6/1988   Bush .......................... 423/228

FOREIGN PATENT DOCUMENTS

| EP | 335034 | 10/1989 |
|----|--------|---------|
| GB | 1589231 | 5/1981 |
| GB | 2103646 | 2/1983 |
| WO | 2004047955 | 6/2004 |

OTHER PUBLICATIONS

Oil & Gas Journal, vol. 69, No. 36, Sep. 6, 1971, pp. 86-90.
Gerhartz W., et al: Coal Liquefaction, Encyclopedia of Industrial Chemistry, vol. A7, p. 203-207,XP-002361897, 1986.

*Primary Examiner*—Jafar Parsa

(57) ABSTRACT

A process for the production of normally gaseous, normally liquid and optionally normally solid hydrocarbons from a light hydrocarbonaceous feed gas stream, which feed gas stream includes sulphur compounds and carbon dioxide, the process comprising the steps of: (i) removing at least most of the sulphur compounds from the feed gas stream by an aqueous amine process in one or more reactors, optionally followed by on or more further treatment processes; (ii) controlling where necessary the amount of carbon dioxide in the feed gas stream in step (i) so as to be in the range 0.25-2.0 v/v&, preferably 0.5-1.5 v/v %, of the processed feed stream; (iii) using the feed gas stream of step (ii) to provide synthesis gas; and (iv) catalytic converting the synthesis gas of step (iii) at an elevated temperature and pressure to obtain the normally gaseous, normally liquid and optionally normally solid hydrocarbons.

16 Claims, No Drawings

REMOVAL OF CARBON DIOXIDE FROM A GAS STREAM

The present application claims priority to European Patent Application 05252967.4 filed 13 May 2005.

FIELD OF THE INVENTION

The present invention relates to a process for the partial removal of carbon dioxide from a gas stream useable as a hydrocarbonaceous feedstock.

BACKGROUND OF THE INVENTION

Various processes are known for the conversion of gaseous hydrocarbonaceous feedstocks, especially methane from natural sources, for example natural gas, associated gas and/or coal bed methane, into liquid products, especially methanol and liquid hydrocarbons, particularly paraffinic hydrocarbons. At ambient temperature and pressure these hydrocarbons may be gaseous, liquid and (often) solid. Such processes are often required to be carried out in remote and/or offshore locations, where no direct use of the gas is possible. Transportation of gas, for example through a pipeline or in the form of liquefied natural gas, requires extremely high capital expenditure or is simply not practical. This holds true even more in the case of relatively small gas production rates and/or fields. Re-injection of gas will add to the costs of oil production, and may, in the case of associated gas, result in undesired effects on crude oil production. Burning of associated gas has become an undesirable option in view of depletion of hydrocarbon sources and air pollution. A process often used for the conversion of carbonaceous feedstocks into liquid and/or solid hydrocarbons is the well-known Fischer-Tropsch process.

The Fischer-Tropsch process can be used for the conversion of hydrocarbonaceous feed stocks into liquid and/or solid hydrocarbons. The feed stock (e.g. natural gas, associated gas and/or coal-bed methane, residual (crude) oil fractions or coal) is converted in a gasifier, optionally in combination with a reforming unit, into a mixture of hydrogen and carbon monoxide (this mixture is often referred to as synthesis gas or syngas).

The synthesis gas is then fed into a Fischer-Tropsch reactor where it is converted in one or more steps over a suitable catalyst at elevated temperature and pressure into paraffinic compounds ranging from methane to high molecular weight modules comprising up to 200 carbon atoms, or, under particular circumstances, even more.

The hydrocarbons formed in the Fischer-Tropsch reactor proceed to a hydrogenation unit, preferably a hydroisomerisation/hydrocracking unit, and thereafter to a distillation unit.

The feed stock, being a natural product, includes a number of impurities. These impurities are not removed by the partial oxidation of the feed stock to form the syngas. The main impurities are hydrogen sulphide, carbon dioxide, mercaptans, and other sulphur containing compounds such as thiophenols and aromatic sulphur compounds, as well as carbonyl sulphide, sometimes also termed carbon oxysulphide, and generally known by the term COS. It is generally desired to remove some if not all of these impurities prior to use of the syngas in a Fischer-Tropsch reaction vessel, as at least the sulphur compounds reduce the effectiveness of the generally used catalysts in Fischer-Tropsch processes, by poisoning the catalysts.

The removal of sulphur-containing compounds from gas streams comprising such compounds has always been of considerable importance in the past and is even more so today in view of continuously tightening environmental regulations. This holds for combustion gases as obtained in the combustion of organic compounds as coal, as well as for natural gas streams to be used for e.g. the preparation of synthesis gas and for residential use or to be transported as liquid natural gas.

Sulphur contaminants in natural gas streams include, beside hydrogen sulphide, carbonyl oxysulphide, carbonyl sulphide and mercaptans. Mercaptans, due to their odorous nature, can be detected at parts per million concentration levels. Thus, it is desirable for users of natural gas to have concentrations of mercaptans lowered to e.g. less than 5, or even less than 2 ppmv, and total concentration of sulphur compounds to e.g. less than 30 or, preferably, less than 20 ppmv, e.g. 15 or 10 ppmv. Sales gas specifications often mention total sulphur concentrations less than 4 ppmv.

Numerous natural gas wells produce what is called "sour gas", i.e. natural gas containing hydrogen sulfide, often in combination with mercaptans, the total amount of sulphur compounds being present in concentrations that makes the natural gas unsuitable for direct use. Considerable effort has been spent to find effective and cost-efficient means to remove these undesired compounds.

A number of processes are known for the removal of sulphur compounds from gas streams such as natural gas. These processes are based on physical and/or chemical absorption, solid bed adsorption and/or chemical reaction. Physical and/or chemical absorption processes suffer from the fact that they frequently encounter difficulties in reaching the low concentration of the undesired sulphur compounds, unless (extremely) large reactors are used. Solid bed adsorption processes suffer from the fact that they are only able to adsorb limited amounts of undesired compounds, while regeneration is relatively cumbersome. Especially large solid beds take relatively large amounts of time for regeneration and disproportionately large amounts of regeneration gas are needed. In addition, the solid adsorption beds usually also remove water, thus requiring frequent regenerations.

Sulphur compounds, especially hydrogen sulfide in combination with mercaptans, and optionally carbonyl sulphide, may be removed from gas streams, especially natural gas streams, by a combined process known from WO2004/047955, in which in a first physical/chemical absorption step, most of the hydrogen sulphide, and a part of the mercaptans is removed, and in a second solid adsorption step, the remaining hydrogen sulphide and the remaining mercaptans and other sulphur compounds are removed.

The above process uses the well-proven physical/chemical absorption process. Such a process has been described in for instance GB 2,103,645 and GB 2,103,646, incorporated herein by reference. Almost all hydrogen sulphide is removed in a very efficient way. As only part of the mercaptans has to be removed in the first step, the process avoids the use of very large and inefficient reactors. In the second step a relatively small solid adsorption bed can be used to remove the remaining part of the mercaptans. This is due to the fact that almost all hydrogen sulphide has already been removed in the first step together with part of the mercaptans. Regeneration of such a bed is not very laborious or cumbersome. Thus, the above combination of sulphur removal processes results in an overall efficient removal of hydrogen sulphide, mercaptans and optionally part of the carbon dioxide and carbonyl sulphide, while avoiding the disadvantages of only one technology or other technologies. In addition, treating the regeneration gas of the solid bed adsorber in a dedicated absorber optimises the process. The loaden solvent of the dedicated absorber is then regenerated in the same regenerator as is used for the main process.

Meanwhile, the natural gas may also contain varying amounts of carbon dioxide. Presently, the carbon dioxide is generally removed, and may be simply vented to atmosphere. However, there is increasing legislation about the emission levels of carbon dioxide.

SUMMARY OF THE INVENTION

The present invention recognizes that it can be desired to maintain some carbon dioxide in the gas stream, as it is partly useable downstream in a Fischer-Tropsch plant. Thus, it may have to be only removed partly from a feed gas stream, reducing the need to deal with any excess.

The present invention provides a process for the removal of sulphur compounds and control of the carbon dioxide level from gas streams.

Thus, the present invention provides a process for the production of normally gaseous, normally liquid and optionally normally solid hydrocarbons from a light hydrocarbonaceous feed gas stream, which feed gas stream includes sulphur compounds and carbon dioxide, the process comprising the steps of:
  (i) removing at least most of the sulphur compounds from the feed gas stream by an aqueous amine washing process in one or more reactors, optionally followed by one or more further treatment processes;
  (ii) controlling where necessary the amount of carbon dioxide in the feed stream in step (i) so as to be in the range 0.25-2.0 v/v %, preferably 0.5-1.5 v/v %, more preferably 0.6-1.0 vol % of the processed feed stream;
  (iii) using the feed stream of step (ii) to provide synthesis gas; and
  (iv) catalytic converting the synthesis gas of step (iii) at an elevated temperature and pressure to obtain the normally gaseous, normally liquid and optionally normally solid hydrocarbons.

DETAILED DESCRIPTION OF THE INVENTION

The light hydrocarbonaceous feed gas for the process of the present invention is suitably methane, natural gas, associated gas or a mixture of $C_{1-4}$ hydrocarbons. The feed comprises mainly, i.e. more than 75 v/v %, especially more than 90 v/v %, preferably more than 94%, $C_{1-4}$ hydrocarbons. The feed especially comprises at least 60 v/v percent methane, preferably at least 75%, more preferably at least 90%. Very suitably natural gas or associated gas is used.

The sulphur compounds in the feed gas stream will generally be hydrogen sulphide, mercaptans and optionally carbonyl sulphide, especially hydrogen sulphide.

The feed gas stream for the process of the present invention may contain low as well as high amounts of sulphur compounds and carbon dioxide. Suitably the total feed gas stream comprises 0.05 to 20 vol % hydrogen sulphide, 1 to 1500 ppmv mercaptans and 0.25 to 40 vol % carbon dioxide, preferably 0.1 to 15 vol % hydrogen sulphide, 20 to 1000 ppmv mercaptans and 0.5 to 20 vol % carbon dioxide. In a special embodiment of the invention, the feed gas stream comprises hydrogen sulphide in an amount between 0.15 and 10 vol %.

The presence of these amounts of $H_2S$ hinders the removal of mercaptans, as $H_2S$ is preferentially adsorbed. Thus, removal of these levels of hydrogen sulphide and mercaptans from a gas stream at the same time or in one step is regarded as very difficult.

The washing process of step (i) of the present invention could comprise one or more passes through one reactor, or a number of stages. Preferably it is a single pass through one reactor. This should be sufficient at removing the hydrogen sulphide (and at least part of the carbon dioxide to the desired level).

The washing process involves washing the feed gas stream with an aqueous amine solution and optionally a physical solvent. The use of aqueous amine solutions comprising a physical solvent for removing so-called acidic gases as hydrogen sulphide and optionally carbon dioxide and/or COS from a gas stream containing these compounds has been described. See for instance A. L. Kohl and F. C. Riesenfeld, 1974, Gas Purification, 2nd edition, Gulf Publishing Co. Houston and R. N. Maddox, 1974, Gas and Liquid Sweetening, Campbell Petroleum Series.

This washing process is at least partly based on carbon dioxide and hydrogen sulphide being highly soluble under pressure in certain solvents, and then being readily releasable from solution when the pressure is reduced as further discussed below.

On an industrial scale there are chiefly two categories of absorption solvents, depending on the mechanism to absorb the acidic components: chemical solvents and physical solvents. Each solvent has its own advantages and disadvantages as to features as loading capacity, kinetics, regenerability, selectivity, stability, corrosivity, heating/cooling requirements etc.

Chemical solvents which are useful in the process of the present invention are primary, secondary and/or tertiary amines derived alkanolamines, especially amines are derived from ethanolamine, especially monoethanol amine (MEA), diethanolamine (DEA), triethanolamine (TEA), diisopropanolamine (DIPA) and methyldiethanolamine (MDEA) or mixtures thereof.

Physical solvents which are suitable in the process of the present invention are cyclo-tetramethylenesulfone and its derivatives, aliphatic acid amides, N-methyl-pyrrolidone, N-alkylated pyrrolidones and the corresponding piperidones, methanol, ethanol and mixtures of dialkylethers of polyethylene glycols or mixtures thereof.

The mixed systems show good absorption capacity and good selectivity against moderate investment costs and operational costs. They perform very well at high pressures, especially between 20 and 90 bara. Preferably in the hydrogen sulphide removal step between 90 and 100 mol % of the hydrogen sulphide based on total amount of hydrogen sulphide present in the gas stream is removed, preferably between 95 and 100 mol %, more preferably between 99 and 100%, even more preferably between 99.9 and 100%. More especially, hydrogen sulphide is removed to a level of less than 10 ppmv, more especially to a level of less than 5 ppmv. Also the amounts of COS and mercaptans is to be reduced till 10 ppmv, preferably 5 ppmv. Further reduction of the mercaptans is possible by reaction with hydrogen (e.g. 1 vol % on natural gas) over a desulfurisation catalyst, for instance a CoMo-catalyst or a NiW-catalyst. Further reduction of COS is possible by hydrolysis, e.g. over a titania-catalyst. Hydrogen sulphide, present after amine treatment and/or obtained by mercaptan reduction or COS hydrolysis, is removed to a level below 10 ppbv, especially 2 ppbv by absorption with e.g. ZnO or Cu or Ni metal.

The preferred physical solvent is sulfolane. The preferred amine is a secondary or tertiary amine, preferably an amine compound derived from ethanol amine, more especially DIPA, DEA, MMEA (monomethyl-ethanolamine), MDEA, or DEMEA (diethyl-monoethanolamine), preferably DIPA or MDEA.

In one way, the aqueous amine washing solution comprises 15 to 60 wt % of water and 40 to 85 wt % of an amine, based on total solution weight. Alternatively, the aqueous amine solution comprises 10 to 50 wt % of water, and optionally 10 to 45 wt % of a physical solvent, and 20 to 65 wt % of amine, all based on total solution weight.

In one embodiment of the present invention, the aqueous amine solution comprises 20 to 35 wt % of water, 20 to 35 wt % of a physical solvent and 40 to 55 wt % of an amine, all based on total solution weight.

The total solution weight of the constituents mentioned above should always total 100%.

Suitably the aqueous amine washing process of step (i) is carried out at a temperature of at least 20° C., preferably between 25 and 90° C., more preferably between 30 and 55° C., and at a pressure between 15 and 90 bara.

The laden solvent obtained in the washing process contains hydrogen sulphide, mercaptans and optionally some carbon dioxide and carbonyl sulphide. It may also contain appreciable amounts of dissolved non-acid components from the gas mixture to be purified, e.g. hydrocarbons, carbon monoxide and/or hydrogen. Suitably, the laden solvent is regenerated in a regenerator at relatively low pressure and high temperature. A lean solvent is obtained and a gas stream comprising hydrogen sulphide, mercaptans and optionally carbon dioxide and carbonyl sulphide. It may be advantageous to remove the non-acid components and any carbon dioxide at least partially from the laden solvent by flashing to a pressure which is higher than the sum of the partial pressures belonging to the hydrogen sulphide and carbon dioxide present in the laden solvent. In this way only small amounts of hydrogen sulphide and any carbon dioxide are released from the solvent together with the non-acid compounds. In a second step the laden solvent can be flashed to a pressure below the sum of the partial pressures of the hydrogen sulphide and any carbon dioxide present in the laden solvent at the prevailing temperature, i.e. to a pressure usually between 1 and 5 bara. Flashing at atmospheric pressure is preferred. The temperature in the last flashing operation is suitably in the range of from 50 to 120° C., preferably between 60 and 90° C.

The washing process acts in the manner of an acid gas removal unit, which selectively removes hydrogen sulphide and organic sulphur compounds, while maximizing carbon dioxide slip.

The control of the amount of carbon dioxide maintained in the feed gas stream can be by various means in the washing process and optionally any further treatment processes of step (i). Generally, the control will be in the reactor for the aqueous amine washing process. A number of parameters can be used to effect this control, including one or more of the following parameters selected from the group comprising; amount of washing material (per volume of feed gas, i.e. the ratio therebetween), type of washing material, temperature of the washing material, size of the reactor, temperature and/or pressure of the feed gas stream, and level of sulfur compounds and carbon dioxide in the feed gas stream.

With respect to the temperature and/or pressure of the feed gas stream, these can of course be altered between extraction of the natural gas from its source and the washing process, but it may also be possible to use e.g. natural gas in the form extracted, which could for instance have a pressure of about 70 bar and a temperature between about 40-50° C.

The washing reactor(s) can include any means for controlling the amount of washing material in the reactor, which can be both in relation to its volume and its velocity, generally based on its pressure. Naturally, the greater amount of washing material per volume of feed gas, the greater degree of expected absorption of carbon dioxide.

The reactor(s) may also be arranged with one or more washing material entry stream means, which arrangement again affects the degree and amount of absorption of carbon dioxide as it passes through the reactor(s).

Generally, washing reactors are elongate and upstanding, such that the feed gas stream flows upwardly and counter to the downward flow of the washing material. A reactor may be of any suitable size, shape and design which is able to effect the absorption of the carbon dioxide by the washing material. This includes considering controlling the ratio of washing liquid to the amount of feed gas stream, preferably in order to wholly or substantially remove the hydrogen sulphide, and provide control over the degree of absorption of carbon dioxide.

It is known that the rate of absorption of hydrogen sulphide and carbon dioxide differs along the length of an elongate reactor, such that another parameter is the size of the reactor, and the distance and/or time of the feed gas stream through the washing process. It may be possible to remove the feed gas stream from a reactor at different exit ports or points, which exit ports or points provide a feed gas stream having a pre-determined composition, especially carbon dioxide percentage. Different exit points along the length of a reactor can allow different treated feed gas stream compositions to be extracted according to what is preferred or desired.

The carbon dioxide slip in the treated gas stream is favourable because its presence helps to produce more carbon monoxide in subsequent reactions such as the reversible water shift reactions in steam methane reforming unit or a hydrogen manufacturing unit, as well as partial oxidation and/or reforming processes.

The amounts of hydrogen sulphide and mercaptans are preferably reduced by the washing process of step (i) to at or below 500 ppm, preferably at or below 50 ppm, which amounts could be further reduced by the use of molecular sieves and/or guard beds as discussed hereinafter. The level of COS is preferably reduced to at or below 100 ppm. In practice, using all the treatment processes of step (i) herein described could provide a gas stream generally containing less than 5 ppm hydrogen sulphide and mercaptans.

One further treatment process of step (i) involves one or more crystalline molecular sieves, more preferably sieve(s) having an average pore diameter of 5 Ångström or more. In a preferred embodiment at least two molecular sieve beds are used containing wide pore diameter mol sieves, preferably one bed containing 5 Å mol sieves, the other bed containing mol sieves of a larger pore diameter, preferably about 7.4 Å (such as for example a 13× mol sieve). The mol sieve having the pore diameter of 5 Å removes hydrogen sulphide (if present), methyl mercaptan and some ethyl mercaptan, while the second bed removes the remainder of the ethyl mercaptan and the higher mercaptans.

It will be appreciated that the above indicated beds can be applied in one single vessel, or may be spread over two or more vessels. The advantage of using more than one vessel is that each vessel may be used and regenerated under the most optimal conditions. This process is suitably carried out at a temperature of 25° C. and a pressure between 15 and 90 bara.

The regeneration of the molecular sieve beds may be done with suitable inert gases. It is preferred to use a hydrocarbon stream, especially a hydrocarbon stream obtained by a process according to the present invention. The regeneration gas containing the mercaptans of this part of the washing process is preferably remixed with the starting gas stream. Preferably a dedicated absorber is used, (especially if the main absorber does not use a physical solvent).

Suitably the amount of mercaptans which is removed by the aqueous amine stream in the washing process is between 70 and 93 mol % (of removed mercaptans), preferably between 75 and 90 mol %, and the amount which is removed by using one or more molecular sieves is between 30 and 7 mol % (of removed mercaptans), preferably between 25 and 10 mol %.

In the washing process of step (i), at least 90 mol % of the hydrogen sulphide is removed (based on total amount of hydrogen sulphide present in the gas stream), preferably 95 mol %, more preferably 98 mol %. The amount of mercaptans in the feed gas stream which could be treated by molecular sieve(s) may be between suitably 5 and 60 ppmv, preferably between 10 and 50 ppmv.

The washing process and any further treatment processes of step (i) of the present invention may be carried out in a continuous mode, preferably using a continuous regeneration process of the aqueous washing solution followed by two or more reactors comprising molecular sieves. In the regeneration process the pressure of the laden washing solution is released, usually in one or two steps, followed by temperature increase. Preferably, the temperature increase is done in a stepwise mode. When using two or more molecular sieve reactors, at least one reactor could be in the absorbing mode and at least one reactor could be in the desorption (regeneration) mode. Depending on the actual situation there may be a combination of two, three, four or even more reactors, one or more in absorbing mode, the others in different stages of desorbing mode.

Another further treatment process of step (i) comprises passing the feed gas stream through one or more guard beds, in particular hydrogen sulphide guard beds, preferably downstream of the washing process and any molecular sieve(s) treatment. The or each hydrogen sulphide guard bed will include one or more hydrogen sulphide adsorbents. Such adsorbents are well known in the art, and could be the same of different from hydrogen sulphide adsorbents used in other locations in the hydrocarbon synthesis system such as guard beds used in other sulphide-removing processes. Such adsorbents include zinc oxide, iron oxide and metal. The or each adsorbent may be promoted by one or more metals such as copper. Where two or more guard beds are used in the present invention, the or each guard bed may include one or more different adsorbents, and the or each guard bed may include the same or different adsorbent(s) from other guard bed(s).

In one embodiment of the present invention, at least one hydrogen sulphide guard bed includes zinc oxide. This absorbs hydrogen sulphide to provide zinc sulphide in a reaction known in the art;

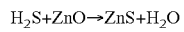

$H_2S + ZnO \rightarrow ZnS + H_2O$

In another embodiment of the present invention, the process includes, either as an addition to or as an alternative to a zinc oxide based guard bed, a guard bed of copper promoted zinc oxide.

The or each hydrogen sulphide guard bed may optionally also contain alumina and/or active carbon.

Another further treatment process comprises the step of dehydration of the feed gas stream. Water may be removed by any one means or combination of means. One means for this is by temperature decrease followed by separation of the feed gas stream and a resultant condensate. Another is using a mol sieve, preferably with a pore opening of less than 5 Å, more preferably 4 Å or 3 Å. It is usual that the feed gas stream from the aqueous amine washing reactor(s) is at least partly, usually substantially, saturated with water, and dehydration helps wholly or substantially to remove such water from the feed gas stream before any optional further treatment. The dehydration process could immediately follow the aqueous amine washing process.

Another further treatment process of step (i) comprises passing the feed gas stream through a natural gas liquids (NGL) unit using cryogenic distillation to separate out materials such as any $C_{2-5}$ compounds. This could operate at a temperature in the range −10 and −80° C., especially in the range −20 and −50° C. The pressure may be between 10 and 100 bar, especially between 20 and 80 bar.

In the NGL unit several cryogenic distillation units may be used. For instance, in a first unit methane may be removed, in a second unit ethane may be removed, in a third unit propane may be removed and in a fourth unit butane may be removed from the remaining $C_{5+}$-hydrocarbons. It is also possible to combine e.g. the first and the second unit, optionally followed by the separation of methane and ethane. Also the third and fourth unit may be combined, optionally followed by the separation of propane and butane. It is also possible to first remove the $C_{5+}$ hydrocarbons, followed by separation $C_1/C_2$ from $C_3/C_4$, optionally followed by the separation of $C_1$ and $C_2$ and/or $C_3$ and $C_4$. Other combinations are also possible. Preferably there is an optimum integration between the separation units, especially with respect of the cold in the several streams. The low temperatures may be obtained from an external source, or, preferably are obtained by adiabatic expansion, e.g. over a Joule-Thomson valve or in an expansion turbine. The amount of $C_2$-$C_4$-compounds present is suitably between 1 and 30 vol % of the total stream, more suitably between 3 and 20 vol %. Ethane is usually present in amounts between 1 and 15 vol % of the total stream, especially between 2 and 10 vol %. Propane is usually present in amounts between 0.5 and 10 vol % based on total stream, especially between 1 and 6 vol %. Butane is usually present between 0.1 and 5 vol % based on total stream, especially between 0.2 and 3 vol %. The amount of $C_{5+}$ compounds is usually up till 5 vol %, especially up till 3 vol %, based on total stream. Nitrogen may be present in the feed gas stream in an amount up till 20 vol % based on total stream, especially between 1 and 12 vol %. The nitrogen will end-up in the methane or methane/ethane stream. In a further preferred embodiment the nitrogen is separated from the methane in order to minimize the amount of inerts in the syngas. In an even further preferred embodiment there is cold integration between the nitrogen removal unit and the natural gas liquid extraction unit.

In the cryogenic process as described above, the carbon dioxide will not form a problem. When the amount of carbon dioxide is more than 2 vol %, e.g. 3 vol %, the carbon dioxide may freeze out in the cryogenic sections. Thus, the amount of carbon dioxide as defined in the main claim allows the full recovery of the natural gas liquids from the natural gas stream, while it allows the maximum recovery of carbon (as carbon monoxide after gasification) as possible.

It will be understood that the skilled person is capable of selecting the most appropriate washing and further treatment processes, and using the processes in a suitable order.

The gas stream provided by step (ii) of the process of the present invention could be used in the preparation of synthesis gas in one or more methods well known in the art, such as the Shell Gasification Process. A comprehensive survey of this process can be found in the Oil and Gas Journal, Sep. 6, 1971, pp 86-90.

The gas stream provided by step (ii) of the process of the present invention could also be used in any other suitable part, unit or apparatus, either integral or associated with, the hydrocarbon synthesis system, such as providing energy and/or power to one or more parts, or as a feed into other processes such as a hydrocarbon manufacturing process. These include various reforming processes, including, but not limited to, steam methane reforming, carbon dioxide reforming, etc, as well as various hydrogen-rich manufacturing process.

Thus, the present invention also provides a process for the production of a hydrogen-rich stream from a light hydrocarbonaceous feed gas stream, which feed gas stream includes sulphur compounds and carbon dioxide, the process comprising the steps of:
  (i) removing at least most of the sulphur compounds from the feed gas stream by an aqueous amine washing process in one or more reactors, optionally followed by one or more further treatment processes;
  (ii) controlling where necessary the amount of carbon dioxide in the feed stream in step (i) so as to be in the range 0.25-2.0 v/v %, preferably 0.5-1.5 v/v %, of the processed feed stream;
  (iii) using the feed stream of step (ii) to provide the hydrogen-rich stream.

In this process, the washing and optional further treatment processes of step (i) preferably comprise one or more of the processes hereinbefore described. Preferably, the hydrogen-rich stream forming process is a reforming process.

The present invention also provides a hydrocarbon product or products whenever formed by a process as herein described, including any products made by hydroconversion and/or hydrocracking and/or hydrogenation of the hydrocarbon product(s). In particular, the present invention provides products generally formed by the Fischer-Tropsch process, including base oils made by solvent dewaxing and/or catalytic dewaxing.

Products of the Fischer-Tropsch synthesis may range from methane to heavy paraffinic waxes. Preferably, the production of methane is minimised and a substantial portion of the hydrocarbons produced have a carbon chain of at least 5 carbon atoms. Preferably, the amount of $C_{5+}$ hydrocarbons is at least 60% by weight of the total product, more preferably, at least 70% by weight, even more preferably, at least 80% by weight, most preferably, at least 85% by weight.

Fischer-Tropsch catalysts are known in the art, and typically include a Group VIII metal component, preferably cobalt, iron and/or ruthenium, more preferably cobalt. Typically, the catalysts comprise a catalyst carrier. The catalyst carrier is preferably porous, such as a porous inorganic refractory oxide, more preferably alumina, silica, titania, zirconia or mixtures thereof.

References to the Periodic Table and Groups herein refer to the previous IUPAC version of the Periodic Table of Elements such as that described in the 68th Edition of the Handbook of Chemistry and Physics (CPC Press).

The optimum amount of catalytically active metal present on the carrier depends inter alia on the specific catalytically active metal. Typically, the amount of cobalt present in the catalyst may range from 1 to 100 parts by weight per 100 parts by weight of carrier material, preferably from 10 to 50 parts by weight per 100 parts by weight of carrier material.

The catalyst suitably has an average diameter of 0.5-15 mm. One form of catalyst is as an extrudate. Such extrudates suitably have a length of 2-10 mm, especially 5-6 mm, and a cross section suitably of 1-6 $mm^2$, especially 2-3 $mm^2$.

The catalytically active metal may be present in the catalyst together with one or more metal promoters or co-catalysts.

The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, manganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

A most suitable catalyst comprises cobalt as the catalytically active metal and manganese and/or vanadium as a promoter.

The promoter, if present in the catalyst, is typically present in an amount of from 0.1 to 60 parts by weight per 100 parts by weight of carrier material. It will however be appreciated that the optimum amount of promoter may vary for the respective elements which act as promoter. If the catalyst comprises cobalt as the catalytically active metal and manganese and/or vanadium as promoter, the cobalt: (manganese+vanadium) atomic ratio is advantageously at least 12:1.

The Fischer-Tropsch synthesis is preferably carried out at a temperature in the range from 125° C. to 350° C., more preferably 175° C. to 275° C., most preferably 200° C. to 260° C. The pressure preferably ranges from 5 to 150 bar abs., more preferably from 5 to 80 bar abs.

The gaseous hourly space velocity may vary within wide ranges and is typically in the range from 500 to 10,000 Nl/l/h, preferably in the range from 1000 to 4,000 Nl/l/h.

It will be understood that the skilled person is capable to select the most appropriate conditions for a specific reactor configuration and reaction regime. These include possible recycling of formed products such as gases and waxes.

The present invention provides the ability to control the level of carbon dioxide in the feed gas stream to being between 0.25-2.0 v/v %, preferably 0.5-1.5 v/v %, more preferably approximately 1.25 v/v %, and optionally above 1.25 v/v %. Such a range provides increased carbon level to produce more carbon monoxide as mentioned above, whilst not affecting certain washing or extraction and treatment processes, such as an NGL-extraction unit.

The present invention also provides a cleaned feed gas stream whenever prepared by one or more washing processes as hereinbefore defined, as well as use of such a gas stream in any part, process, unit, apparatus or otherwise in a hydrocarbon synthesis system. This includes preparation of synthesis gas for a hydrocarbon synthesis process, such as a Fischer-Tropsch process.

What is claimed is:
1. A process for the production of normally gaseous and normally liquid hydrocarbons from a light hydrocarbonaceous feed gas stream, which feed gas stream includes sulphur compounds and carbon dioxide, the process comprising the steps of:
  (i) removing at least most of the sulphur compounds from the feed gas stream by an aqueous amine washing process in one or more reactors;
  (ii) controlling the amount of carbon dioxide in the feed gas stream in step (i) so as to be in the range 0.25-2.0 v/v %;
  (iii) using the feed gas stream of step (ii) to provide synthesis gas; and
  (iv catalytically converting the synthesis gas of step (iii) at an elevated temperature and pressure to obtain the normally gaseous and normally liquid hydrocarbons.

2. A process as claimed in claim 1 wherein the sulphur compounds are hydrogen sulphide and mercaptans.

3. A process according to claim 2 in which the light hydrocarbonaceous feed gas stream comprises 0.05 to 20 vol % hydrogen sulphide, 1 to 1500 ppmv mercaptans and 0.25 to 40 vol % carbon dioxide.

4. A process as claimed in claim 2 wherein the washing process of step (i) comprises washing the feed gas stream with an aqueous amine washing solution, wherein the aqueous amine washing solution comprises 15 to 60 wt % of water and 40 to 85 wt % of an amine, based on total solution weight.

5. A process according to claim 4 in which the amine is a secondary or tertiary amine.

6. A process as claimed in claim 1 wherein the washing process of step (i) is followed by a treatment step of dehydration, wherein the dehydration is carried out at a temperature in the range 20 to 25° C.

7. A process according to claim 1 wherein the washing process of step (i) is followed by a treatment step of passing the feed gas stream through one or more crystalline molecular sieve(s).

8. A process as claimed in claim 1 wherein the washing process of step (i) is followed by a treatment step of passing the feed gas stream through at least one guard bed, which guard bed(s) include one or more hydrogen sulphide adsorbents.

9. A process as claimed in claim 1 wherein the washing process of step (i) is followed by a treatment step of natural gas liquids removal by decreasing the temperature of the feed gas stream.

10. A process as claimed in claim 1 wherein the amount of carbon dioxide maintained in the feed gas stream is controlled by one or more of the following parameters in step (i) selected from the group consisting of: amount of washing material (per volume of feed gas), type of washing material, size of the reactor, temperature and/or pressure of the feed gas stream, temperature of the washing material, and level of sulphur compounds and carbon dioxide in the feed gas stream.

11. A process for the production of normally gaseous and normally liquid hydrocarbons from a light hydrocarbonaceous feed gas stream as claimed in claim 1 followed by hydrocracking of said hydrocarbons, and followed by distillation and/or catalytic dewaxing.

12. A process as claimed in claim 1 wherein the amount of carbon dioxide in the feed gas stream is in the range of 0.5-1.5 v/v %.

13. A process as claimed in claim 4 wherein the aqueous amine washing solution comprises 10 to 50 wt % water, 10 to 45 wt % sulfolan and 20-65 wt % amine, all based on total solution weight.

14. A process as claimed in claim 4 in which the amine is derived from ethanol amine, DIPA, DEA, MMEA, MDEA, DEMEA or mixtures thereof.

15. A process as claimed in claim 7 wherein the molecular sieves have an average pore diameter of 5 Ångström or more.

16. A process as claimed in claim 7 wherein one molecular sieve has an average pore diameter of 5 Ångström and a second molecular sieve has an average pore diameter of about 7.4 Ångström.

* * * * *